United States Patent [19]

Das et al.

[11] Patent Number: 4,748,167
[45] Date of Patent: May 31, 1988

[54] WATER-BASED COATING COMPOSITIONS COMPRISING EPOXY-CONTAINING ACRYLIC POLYMERS AN POLYFUNCTIONAL WATER-SOLUBLE AMINES

[75] Inventors: Suryya K. Das, Pittsburgh; Kurt G. Olson, Gibsonia; James A. Claar, Export, all of Pa.

[73] Assignee: PPG Industries, Inc., Pittsburgh, Pa.

[21] Appl. No.: 636,754

[22] Filed: Aug. 1, 1984

[51] Int. Cl.$^4$ .............................................. C08L 63/10
[52] U.S. Cl. .................................... 524/410; 524/406; 524/412; 524/414; 525/327.3
[58] Field of Search ............... 523/414, 406, 410, 412; 525/327.3

[56] References Cited

U.S. PATENT DOCUMENTS

| | | | |
|---|---|---|---|
| 3,236,895 | 2/1966 | Lee et al. ............................... | 528/60 |
| 4,067,838 | 1/1978 | Hayashi et al. ....................... | 523/414 |
| 4,167,498 | 9/1979 | Waddill ................................. | 523/414 |
| 4,179,552 | 12/1979 | Waddill ................................. | 528/111 |
| 4,197,389 | 4/1980 | Becker et al. ........................ | 523/414 |
| 4,367,298 | 1/1983 | Abbey et al. ......................... | 523/402 |
| 4,423,166 | 12/1983 | Moriarity et al. .................... | 523/414 |
| 4,423,170 | 12/1983 | Waddill ................................. | 523/414 |
| 4,522,962 | 6/1985 | Abbey et al. ......................... | 523/410 |

OTHER PUBLICATIONS

Crews et al., Paint Research Institute, Proceedings/No. 139, "Application of Hydrodynamic Volume and Swelling Theory to the Crosslinking of Latex Particles".
Simms, "Expoxide-Substituted Vinyl and Acrylate Copolymers"—paper presented at the Sep. 1959 mtg. of the American Chemical Society, symposium on epoxide resins.

*Primary Examiner*—Allan M. Lieberman
*Attorney, Agent, or Firm*—Godfried R. Akorli

[57] ABSTRACT

Disclosed herein are ambient temperature-curable compositions of improved pot life comprising epoxy-containing vinyl polymers and oxygen-containing amines. Coating compositions comprising the same cure at ambient temperature to produce films of excellent properties.

8 Claims, No Drawings

WATER-BASED COATING COMPOSITIONS COMPRISING EPOXY-CONTAINING ACRYLIC POLYMERS AN POLYFUNCTIONAL WATER-SOLUBLE AMINES

BACKGROUND OF THE INVENTION

1. Field of the Invention

The present invention relates to curable polymers. More specifically, the present invention relates to ambient temperature-curable compositions containing water-borne epoxy-containing vinyl addition polymers.

2. Brief Description of the Prior Art

Self-curable compositions comprising amino-containing polymers and epoxy functional polymers are known in the art. There has been great difficulty in keeping these compositions from reacting prematurely. Hence, there has been a concern with pot life and stability of these compositions, and consequently, much work has been expended with film properties of these compositions in improving these compositions to these ends.

One solution to the problem of premature reaction entails capping the reactive amino groups with, say, ketones to form a ketimine prior to mixing the amine-containing polymers with the epoxy-containing polymer. After the coating is applied, atmospheric moisture causes the ketimine to decompose yielding reactive amino polymers which co-react with the epoxy-containing polymer to effect cure. There are two main drawbacks to this type of composition. First, it is limited to non-aqueous systems and second, the ketone is released upon cure, thus causing environmental pollution problems.

Another solution to the problem comprises using amino and epoxy-containing polymers which are water-insoluble. To reduce solvent pollution, there are employed lower viscosity amino and epoxy-containing polymers in admixtures that require little or no solvent or the use of water as the solvent.

In the case of the solvent-based compositions, molecular mixing brings the reactants into immediate contact, thus precipitating premature reaction. In the case of the water-based compositions, the amino and epoxy-containing polymers are emulsified separately and blended just before application. Generally, the individual emulsified polymers consisting of many individual molecules are not stabilized enough to prevent coagulation with each other. Compositions containing these emulsified polymers are therefore not sufficiently stable.

SUMMARY OF THE INVENTION

The present invention encompasses curable water-based compositions of improved pot-life comprising:
  i. an epoxy-containing vinyl polymer; and
  ii. an oxygen-containing amine having at least two reactive amino hydrogens per molecule; said amine having molecular weight less than 5000.

In a preferred embodiment, the present invention encompasses a curable water-based composition of improved pot life comprising:
  i. a vinyl addition latex polymer, and
  ii. a polyoxyalkylenepolyamine.

The amines are preferably water-soluble.

Coatings of the water-based compositions provide films of excellent properties such as solvent resistance, weather-durability and other desirable properties, viz. gloss and/or color retention.

DETAILED DESCRIPTION OF THE INVENTION

The epoxy-containing vinyl polymers are preferably water-borne polymers such as latices, e.g., acrylic latices. The acrylic latex polymer of this invention is a latex which is prepared by free radical polymerization of ethylenically unsaturated monomers in an aqueous medium. At least one of the monomers is an epoxy-containing monomer. Non-limiting examples of the epoxy-containing monomers are glycidyl acrylate, glycidyl methacrylate, allyl glycidyl ether and the like.

Generally, the epoxy-containing monomer of the vinyl polymer can be copolymerized in an amount of about 1 to 80 percent by weight based on the total monomer content.

Non-limiting examples of the other ethylenically unsaturated monomers are mono-olefinic hydrocarbons containing only atoms of hydrogen and carbon such as styrene, alpha-methyl styrene, alpha-ethyl styrene, alpha-butyl styrene, and the like; halogenated mono-olefinic hydrocarbons containing carbon, hydrogen and one or more halogen atoms such as alpha-chlorostyrene, alpha-bromostyrene, 2,5-dichlorostyrene, and 3,4-dichlorostyrene, and the like; esters of organic acids such as vinyl acetate, vinyl propionate, vinyl benzoate, vinyl chlorobenzoate, vinyl o-chlorobenzoate, vinyl m-chlorobenzoate, methyl methacrylate, ethyl acrylate, ethyl methacrylate, butyl acrylate, hexyl acrylate, octyl methacrylate, decyl methacrylate, methyl crotonate, ethyl crotonate, ethyl tiglate, methyl acrylate, 2-ethylhexyl acrylate, methyl methacrylate, 2-ethylhexyl methacrylate; allylic monomers such as allyl chloride, allyl bromide, allyl formate, allyl acetate, allyl benzoate, and the like. Others such as dimethyl maleate and diethyl fumarate can be used. It is, however, preferred that the monomers contain single ethylenic unsaturation, preferably in a terminal position.

The other ethylenically unsaturated monomer is selected on the basis that it imparts desired properties to the resultant latex and that it does not adversely affect the preparation or use of the latex. In this regard, monomers such as sulfoethyl methacrylate have been found to be very effective in the preparation of the latices of interest.

The process of preparing the latex may be carried out according to conventional emulsion polymerization techniques. If a surfactant is to be used, the following steps are generally practiced. To a reactor vessel are added water and one or more surfactants. The vessel is heated to and maintained at temperatures in the range of from 30° to 95° C., depending on the catalyst system employed, while a pre-emulsified mixture of monomers (with further surfactant), at least one polymerization initiator, and water is added. Further additions of the pre-emulsified feed are made over a period of 2 to 6 hours. When monomers containing co-reactive functional groups are included, separate feeds of each monomer are employed in order to prevent premature reaction.

If the polymerization is to be surfactant-free, the following technique can be employed. All of the water is placed in a reactor vessel and a solution of a polymerization initiator such as ammonium persulfate and a pH buffer such as sodium bicarbonate are added to the vessel which has been heated to about 30°-90° C. Approximately one-half of the initiator to be used is added to the vessel with this first addition. The remainder of the initiator solution is added concurrently but separately with the monomers which are then fed into the reactor vessel over a period of from about 3 to 6 hours, with the temperature of the vessel being maintained. Further initiator may be added after this period, if required.

The resultant latex is neutralized with a base such as ammonia in order to enhance its stability.

The oxygen-containing amines useful herein have at least two reactive amino hydrogens per molecule and also have molecular weights typically below 5000 and preferably below 2000. Typically, the oxygen-containing amines useful herein are water-soluble.

The presently preferred amines are polyoxyalkylenepolyamines such as diamines having the following structural formula:

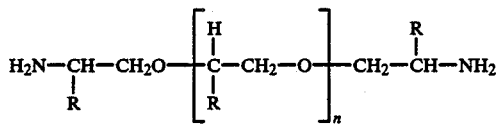

wherein R can be the same or different and is selected from the class consisting of hydrogen, lower alkyl radicals having from 1 to 6 carbon atoms, and n represents an integer of from about 1 to 50, preferably 1 to 35. A number of such polyoxyalkylenepolyamines are described in more detail in U.S. Pat. No. 3,236,895, column 2, lines 40–72; methods of preparation of the polyoxyalkylenepolyamines are illustrated in the patent in Examples 4, 5, 6 and 8–12 in columns 4 to 9 thereof; the aforementioned portions of U.S. Pat. No. 3,236,895 hereby being incorporated by reference.

Mixed polyoxyalkylenepolyamines can be used, that is, those in which the oxyalkylene group can be selected from more than one moiety. Examples would be mixed polyoxyethylene-propylenepolyamines such as those having the following structural formula:

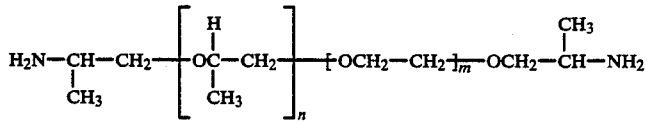

wherein n+m is equal to 1 to 50, preferably 1 to 35, m is equal to 1 to 49, preferably 1 to 34, and n is equal to 1 to 34.

Besides the polyoxyalkylenepolyamines mentioned above, derivatives of polyoxyalkylenepolyamines may also be usable.

Therefore, in the practice of the invention, where the expression "polyoxyalkylenepolyamines" is used, what is intended are polyamines containing both oxyalkylene groups and at least two amine groups, preferably primary amine groups, per molecule. The polyamine preferably will have a molecular weight (number average) of about 137 to 3600, preferably about 200 to 3000, and most preferably 400 to 2500. The polyamines will preferably have amine equivalent weights of about 69 to 1800, preferably about 100 to 1500. In determining the equivalent weights, the primary amines are considered to be monofunctional. Products with molecular weights much higher than 3600 are not preferred because of poor solubility characteristics.

The polyoxyalkylenepolyamines is employed in an amount sufficient to produce effective cure of the instant composition, without imparting undue water-sensitivity thereto. In this regard, the ratio of equivalent active hydrogens in polyoxyalkylenepolyamine to equivalent of epoxy in the epoxy-containing acrylic latex is preferably within the range of 1.15 to 1.80:1, preferably 1.20 to 1.70:1, most preferably 1.25 to 1.50:1 to produce reaction products giving the desirable properties.

Specific examples of the polyoxyalkylenepolyamines useful herein are those available from the Texaco Chemical Company under the trade name JEFFAMINE, for example, JEFFAMINE D-400, JEFFAMINE D-1000 and JEFFAMINE T-403.

Non-limiting examples of other amines are those that can be prepared by reacting polyamines such as ethylenediamine with methyl glycidyl ether. Yet other examples of amines useful herein are amino alcohol containing at least two reactive amino hydrogens. Illustrative examples thereof are ethanolamine, isopropanolamine, isobutanolamine and the like.

In the practice of this invention, the water-based composition comprising the acrylic latex polymer and the polyoxyalkylenepolyamine can be formulated into coating compositions. The coating compositions typically contain coalescing agents and may contain additives such as thickening agents, stabilizers, anti-foaming agents, preservatives, pigments, pigment extenders, plasticizers and the like, if desired. The selection of the coalescing agent is within the purview of the skilled artisan. However, it should be noted that the type of coalescing agent and manner in which it is incorporated into a coating formulation may be determinative of coating properties such as flexibility or brittleness. The coating formulations can be used as interior or exterior paints.

Having generally described the features of this invention, the following examples are given to illustrate more fully to those skilled in the art, the practice of this invention without intending any limitations thereby. All parts and percentages are by weight unless otherwise indicated.

EXAMPLE I

This illustrates a water-based ambient temperature-curable composition of this invention and methods of preparing and using same.

Part 1

The acrylic latex component of the composition was prepared as follows.

| Ingredients | Reactor Charge Parts by Weight (grams) |
|---|---|
| Deionized water | 1504.3 |
| Sodium bicarbonate | 7.0 |
| 2-Sulfoethyl methacrylate | 10.1 |

| Feed A | |
| --- | --- |
| Ingredients | Parts by Weight (grams) |
| Deionized water | 26.6 |
| Ammonium peroxydisulfate | 8.5 |

| Feed B (Monomer Mix) | |
| --- | --- |
| Ingredients | Parts by Weight (grams) |
| Glycidyl methacrylate | 457.0 |
| Ethyl acrylate | 304.1 |
| Methyl methacrylate | 604.3 |
| Styrene | 157.7 |

The reactor charge was heated and agitated under a nitrogen atmosphere to a temperature of 85° C. followed by addition of Feed A. The temperature of the resultant mixture was held at 85° C. and 5 minutes, addition of Feed B was commenced. With the completion of the addition of Feed B, the reaction mixture was held for 45 minutes. Thereafter, the mixture was allowed to cool, discharged and analyzed. The resultant acrylic latex had a pH of 4.23, solids content at 150° C. was 50.5, epoxy equivalent was 1010, and particle size was 1211 Angstrom.

The above acrylic latex in combination with JEFFAMINE D-230 and/or D-400 and other additives were formulated into coating compositions A through E as follows.

| | Parts by Weight (grams) | | | | |
| --- | --- | --- | --- | --- | --- |
| Ingredients | A | B | C | D | E |
| JEFFAMINE D-230[1] | 75 | 75 | 100 | — | 75 |
| JEFFAMINE D-400[2] | — | — | — | 100 | — |
| Titanium dioxide | 250 | 250 | 250 | 250 | 250 |
| Magnesium aluminum silicate | — | 42 | — | — | — |
| Coalescing agent[3] | — | — | 25 | — | 50 |
| 2-Butoxyethanol | 60 | 60 | — | — | 60 |
| Deionized water | — | 140 | 75 | — | 165 |
| Acrylic latex of Part 1 | 450 | 450 | 450 | 450 | 450 |

[1]Difunctional primary polyoxypropyleneamine with an average molecular weight of 230, which is available from Texaco Chemical Co.
[2]Difunctional primary polyoxypropyleneamine with an average molecular weight of 400, which is available from Texaco Chemical Co.
[3]Propylene glycol monoethyl ether available as DOWANOL PM from Dow Chemical Company.

The above ingredients were formulated in coating compositions in the proportions described above by thoroughly mixing the ingredients. Coating compositions obtained therefrom were applied by a drawdown method on a polypropylene substrate (LINETTA® scrub panel by Linetta Company). Cured films of 3-mil thickness were obtained after 24 hour room temperature dry time.

The coating compositions were found to be stable in that they retained their integrity after 7 days at room temperature.

Solvent resistance was evaluated by applying to the cured film drops of various solvents, placing a watch glass thereon and visually ascertaining the effect of the solvents on the coating. The solvents used in the test were methyl ethyl ketone, five percent sodium hydroxide solution (in water), DOWANOL PM (propylene glycol monomethyl ether), and glacial acetic acid. It was found that after 16 hours, the coating retained its properties.

EXAMPLE II

Part 1

The following example shows the preparation of the acrylic latex component. The following were used in the preparation.

| Reactor Charge | |
| --- | --- |
| Ingredients | Parts by Weight (grams) |
| Deionized water | 1204.2 |
| Sodium bicarbonate | 7.0 |
| 2-Sulfoethyl methacrylate | 10.0 |

| Feed A | |
| --- | --- |
| Ingredients | Parts by Weight (grams) |
| Deionized water | 25.2 |
| Ammonium persulfate | 8.5 |

| Feed B (Monomer Mix) | |
| --- | --- |
| Ingredients | Parts by Weight (grams) |
| Glycidyl methacrylate | 457.7 |
| Ethyl acrylate | 301.1 |
| Methyl methacrylate | 453.5 |
| Styrene | 155.1 |
| 2-Ethylhexyl methacrylate | 150.0 |

The reactor charge was heated and agitated under a nitrogen atmosphere to a temperature of 86° C. followed by addition of Feed A. The temperature of the resultant mixture was held at 85° C. and after 5 minutes, addition of Feed B was commenced and carried out over 3 hours. With the completion of the addition of Feed B, the reaction mixture was held for 1 hour. Thereafter, the mixture was allowed to cool, discharged and analyzed. The resultant acrylic latex had a pH of 5.65, solids content at 150° C. was 56.2, epoxy equivalent was 966, and particle size was 1588 Angstrom.

The above acrylic latex in combination with JEFFAMINE D-230 and/or D-400 and other additives were formulated into coating compositions A through H as follows.

Part 2

This example illustrates a coating composition of this invention. The following were used in the preparation:

| | Parts by Weight (grams) | | | | | | | |
| --- | --- | --- | --- | --- | --- | --- | --- | --- |
| Ingredients | A | B | C | D | E | F | G | H |
| JEFFAMINE D-230 | 15 | 15 | 15 | 15 | 15 | 15 | 10 | 20 |
| Plasticizer[1] | 2 | 4 | 6 | 8 | 10 | 20 | 10 | 10 |
| Deionized water | 15 | 15 | 15 | 15 | 15 | 15 | 10 | 20 |
| Acrylic latex of | 60 | 60 | 60 | 60 | 60 | 60 | 60 | 60 |

| Ingredients | Parts by Weight (grams) | | | | | | |
|---|---|---|---|---|---|---|---|
| | A | B | C | D | E | F | G | H |
| Part 1 | | | | | | | | |

[1]The plasticizer comprised a blend of 50 parts by weight grams of TEXANOL, 10 parts by weight grams of IGEPAL CO897 (nonylphenol polyethylene oxide available from GAF Co.) and 40 parts by weight of deionized water.

The above ingredients with the exception of the acrylic latex were blended. The acrylic latex was thereafter added to the blend under agitation to produce the coating compositions.

The coating compositions had very good flow properties. The coating compositions were used to coat essentially the same types of substrates in the manner described in Example I. The cured coatings had good film properties.

What is claimed is:

1. A water-based curable composition comprising:
   (i) water-borne epoxy-containing vinyl polymer which is derived from copolymerizing from about 1 to 80 percent by weight of an ethylenically unsaturated epoxy-containing monomer with other ethylenically unsaturated monomers based on the total monomer content, and
   (ii) an oxygen-containing amine having at least two reactive amino hydrogens per molecule and also having a molecular weight less than 5000; said oxygen-containing amine is present in an amount sufficient to produce an effective cure of the composition without imparting undue water sensitivity thereto.

2. A water-based curable composition of claim 1, wherein the water-borne polymer is an acrylic latex.

3. A water-based curable composition of claim 1, wherein the amine has a molecular weight less than 2000.

4. A water-based curable composition of claim 1, wherein the amine is water-soluble.

5. An ambient temperature-curable water-based composition comprising:
   (i) an acrylic latex polymer which is derived from copolymerizing ethylenically unsaturated monomers, at least one of which is an epoxy-containing monomer; and
   (ii) a polyoxyalkylenepolyamine.

6. An ambient temperature-curable composition of claim 5, wherein the epoxy-containing monomer is glycidyl acrylate or glycidyl methacrylate.

7. An ambient temperature-curable composition of claim 5, wherein the polyoxyalkylenepolyamine is a polyoxypropylene diprimary amine having 3 to 90 oxypropylene groups.

8. A coating composition comprising the ambient temperature-curable water-based composition of claim 5 and one or more coelescing agents, thickening agents, stabilizers, anti-forming agents, preservataives, pigments, pigment extenders or plasticizers.

* * * * *

UNITED STATES PATENT AND TRADEMARK OFFICE
CERTIFICATE OF CORRECTION

PATENT NO. : 4,748,167
DATED : May 31, 1988
INVENTOR(S) : Suryya K. Das, et al

It is certified that error appears in the above-identified patent and that said Letters Patent is hereby corrected as shown below: On the Title Page:

In the title, Item (54) "AN" should read --AND--.

Signed and Sealed this

Eleventh Day of October, 1988

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO.  : 4,748,167
DATED       : May 31, 1988
INVENTOR(S) : Suryya K. Das et al It is certified that error appears in the above-identified patent and that said Letters Patent is hereby corrected as shown below:

In claim 1 (column 7, line 20), please insert --a-- before the word "water-borne" and (line 23) please insert a comma (,) after the word "monomers".

In claim 8 (column 8, line 28), the spelling of "preservatives" is incorrect. Please delete "preservataives" and replace with --preservatives--.

Signed and Sealed this

Eleventh Day of September, 1990

Attest:

HARRY F. MANBECK, JR.

*Attesting Officer*   *Commissioner of Patents and Trademarks*